United States Patent
Livne et al.

(10) Patent No.: US 9,131,070 B2
(45) Date of Patent: Sep. 8, 2015

(54) SYSTEM AND METHOD TO SUPPORT SMART OFFLOADING OF AN ONLINE CHARGING SYSTEM USING A SERVICE CAPABILITY INTERACTION MANAGER

(71) Applicant: Oracle International Corporation, Redwood Shores, CA (US)

(72) Inventors: Shlomo Livne, Ra'Anan (IL); Amnon Heiman, Tel-Avia (IL); Nadav Kadosh, Givaataim (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 130 days.

(21) Appl. No.: 13/957,688

(22) Filed: Aug. 2, 2013

(65) Prior Publication Data
US 2015/0036547 A1    Feb. 5, 2015

(51) Int. Cl.
*H04M 15/00*    (2006.01)

(52) U.S. Cl.
CPC .................................... *H04M 15/64* (2013.01)

(58) Field of Classification Search
CPC ..... H04M 15/61; H04M 15/66; H04M 17/00; H04W 4/26
USPC .............. 379/114.03, 114.17, 114.2, 114.28, 379/14.29
See application file for complete search history.

(56) References Cited

U.S. PATENT DOCUMENTS

| | | | | |
|---|---|---|---|---|
| 5,995,822 A * | 11/1999 | Smith et al. | ................... | 455/406 |
| 6,021,189 A * | 2/2000 | Vu | .......................... | 379/114.17 |
| 7,769,151 B2 * | 8/2010 | Zhang et al. | ............... | 379/114.2 |
| 2007/0286367 A1* | 12/2007 | McCann et al. | ........... | 379/114.2 |
| 2009/0204520 A1* | 8/2009 | Karlsson | ........................ | 705/34 |

* cited by examiner

*Primary Examiner* — Quoc D Tran
(74) *Attorney, Agent, or Firm* — Tucker Ellis LLP

(57) ABSTRACT

A system and method which overcome capacity and latency limitations of online charging systems. In an embodiment of the invention an online mediation system includes a SCIM, a Local-OCS and an SDR Processor. The SCIM includes smart offloading functionality which can determine, based on network events and account status, whether a session should be offloaded. Where a session should be offloaded, the SCIM initializes and mediates an offloaded charging session with the Local-OCS. In an embodiment, the SCIM includes smart offloading functionality which make a determination within an offloaded session based on additional network events, the used units and the account status whether a session should continue to be offloaded. Where a session should not continue to be offloaded, the SCIM terminates the offloaded charging session with the Local-OCS and initializes and mediate a charging session with an online OCS.

20 Claims, 6 Drawing Sheets

SYSTEM AND METHOD TO SUPPORT SMART OFFLOADING OF AN ONLINE CHARGING SYSTEM USING A SERVICE CAPABILITY INTERACTION MANAGER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to charging in telecommunications networks and in particular to a system and method for smart offloading of an online charging system.

BACKGROUND

Online Charging Systems (OCS) allow for two modes of charging: offline charging and online charging. Offline charging entails post processing after session ends. Offline charging is quick, very efficient, and allows for bulk charging operations. However, Offline Charging does not provide all charging functionality of the OCS. Online charging entails processing in session in an online manner. Online charging is less efficient, requires that the online charging system maintain a session for the length of the user session, and is not amendable to bulk charging transactions. Online Charging is usually preferable from a functionality and user experience aspect. However, Online Charging is also more demanding with respect to network resources and thus, a network may have less capacity to support Online Charging.

Although telecommunications network operators have invested significantly in enhancing their online charging capabilities and capacity, the proliferation of smart devices that allow multiple data sessions and the growth in usage of such devices place a significant burden on online charging systems.

It would therefore be desirable to provide a system and method which overcomes the limitations of the present modes of operating an OCS and provide substantial charging functionality with unnecessary network burden.

SUMMARY

The present invention provides a smart offloading system and method which may be used in all cases in which it is desirable to enhance switching between online and offline charging. Mediation of charging can be used in many cases (SIP-Ro, Ro-Ro, CAP-Ro, WIN-Ro). Embodiments of the present invention can thus be used to enhance decision making regarding the switch from offline to online charging in all of these network types, including networks in which the network monitors and counts (Ro-Ro, Cap-Ro); and in which the SCIM monitors and counts (Sip-Ro, Cap-Ro, Win-Ro etc.).

Embodiments of the present invention provide a system and method which overcomes the limitations of the present modes of operating an OCS and provide substantial charging functionality with unnecessary network burden.

In an embodiment, the present invention provides an online mediation controller including an Online Mediation Controller including a Local-OCS which provides for offloading of OCS sessions. The Online Mediation Controller includes smart offloading functionality which provides for smart offloading of the OCS to the Local-OCS.

In an embodiment of the invention, the online mediation controller in response to an initial charging event in the form of an initial Credit Control Request (CCR) from a Charging Trigger Function (CTF) checks the state of the user account and makes an initial determination whether the session should be offloaded to the Local-OCS. Additionally, the online mediation controller in response to an additional charging event in the form of an update Credit Control Request (CCR) from a Charging Trigger Function (CTF) checks the state of the user account and makes a further determination whether the session should be offloaded. In the event the session is offloaded, CCR request are routed to the Local-OCS which generates the appropriate CCA. At the end of the session or upon determination that the session should no longer be offloaded the units used in the session are charged to the OCS.

The system and method are advantageous because charging sessions or significant portions thereof can be conducted by the Local-OCS thereby obviating the need to maintain an OCS session for the duration of the user session. Thus, the system and method provide all the functionality of online charging without excessive burden on network resources. This allows for greater online charging functionality with overburdening OCS capacity.

As the proliferation of smart devices is increasing and customers usage on these devices of multiple sessions is more common (multiple data sessions) the smart-offloading functionality provided by embodiments of the present invention is a large improvement that reduces the load from the OCS by allowing processing of a substantial part of their load in an offloaded manner to the Local-OCS with subsequent rapid replay of SDR to the OCS. In addition the solution allows to lower the overall latency because, while a session is offloaded, the SCIM is able to respond "on its own" using the Local-OCS rather than waiting for the OCS response.

While network operators have all invested in their OCS systems to assure their capacity to handle multiple session and response time is improved by assuring online charging will be possible for all sessions it is clear that as more and more devices are connected, single accounts will have more and more multiple sessions in parallel and operators desire to monetize this data sessions individually (departing from flat data plans). Smart offloading as provided by embodiments of the present invention is a solution that allows operators to use their OCS systems more effectively for cases that require online charging.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such FIG. 1f the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Figure 1:
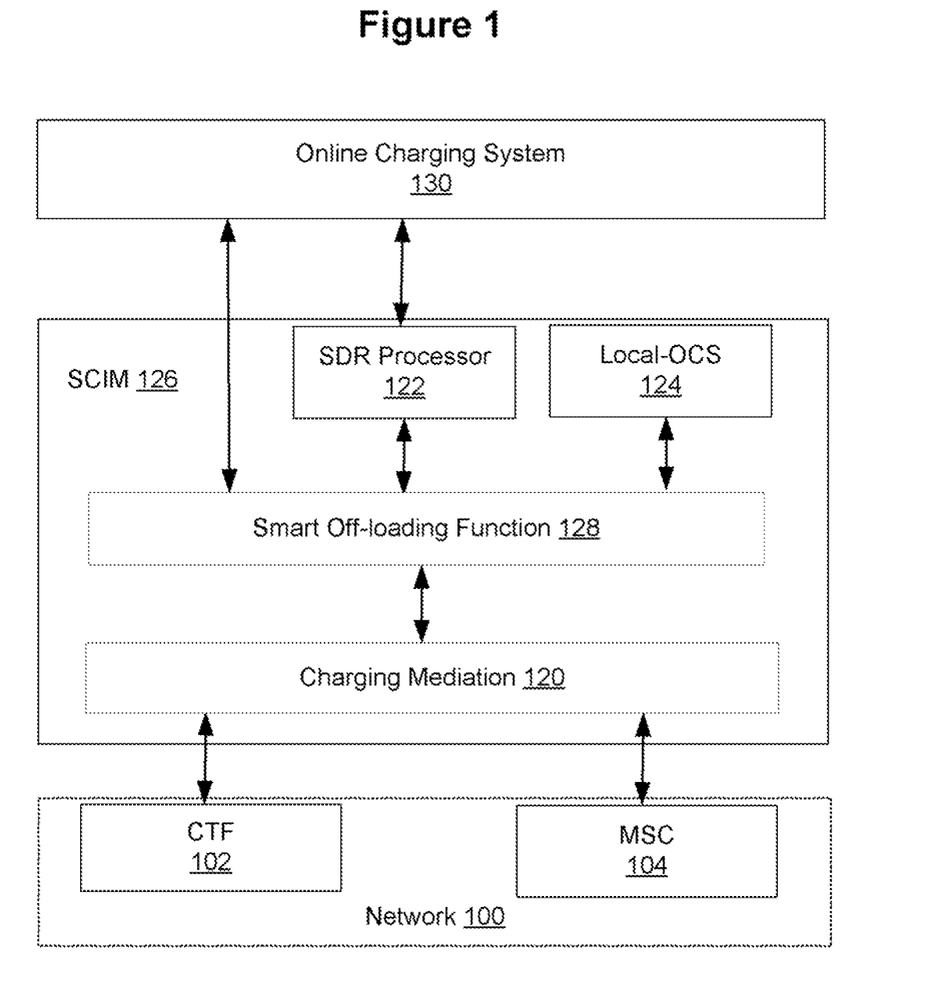
FIG. 1 shows an enhanced online charging system including smart offloading functionality according to an embodiment of the invention.

FIG. 1 shows an SCIM 126 which includes smart offloading functionality 128 to provide enhanced charging capabilities in accordance with an embodiment of the invention. SCIM 126 supports a flexible charging infrastructure which maximizes existing charging components. Unified mediation pulls charging operations together, allowing a single charging strategy to be applied across networks and business groups.

SCIM 126 acts as a single interface for one or more Online Charging System (OCS) 130, mediating network protocol messages (Diameter, Radius, CAMEL, WIN etc.) to the OCS 130 for rating, authentication, and authorization.

On the side facing network 100, SCIM 126 includes Charging Mediation function 120 which can communicate with a plurality of network session controllers such as CTF 102 and MSC 104 over a variety of signaling protocols including, for example, Diameter and Radius (CTF) signaling protocol, CAP/WIN (MSC) signaling protocol; and SIP (Session Initiation Protocol). Charging Mediation 120 normalizes network events for processing within SCIM 126. The Charging Mediation 120 can provide a unified charging experience for a variety of session control network types (e.g., CAP2, CAP3, CAP4, WIN2, Ro, and SIP/ISC).

SCIM 126 which provides the ability to combine the service logic of multiple services and deliver the combined services to sessions in the network. In an embodiment of the present invention SCIM 126 includes Session Detail Record (SDR) Processor 122 and Local-OCS 124. SDR Processor 122 replays an ended session SDR toward the OCS 130. Local-OCS 124 is an OCS internal to SCIM 126 that can provide allocations for sessions that are offloaded. SDR Processor 122 and Local-OCS 124 allow for offloading of OCS 130. SCIM 126 includes smart offloading functionality 128 for determining whether sessions should be offloaded.

Where SCIM 126, using smart offloading function 128, determines that a session should be offloaded, SCIM 126 redirects charging to Local-OCS 124 instead of OCS 130. Local-OCS 124 handles the charging protocol control during the session. Consequently it is unnecessary for OCS 130 to maintain a session for the entirety of the user session. Upon termination of the offloaded session, SCIM 126 can transmit the results of the charging session to OCS 130. This transmission can be achieved, for example with SDR Processor 122. If SDR Processor 122 is used, a session must be opened between SDR Processor 122 and OCS 130, However, the duration of the session is very short—only the length of time necessary to transmit the charging transactions and responses—thus the duration of the SDR Processor session can be vastly reduced compared to the duration of the user session. This reduces overhead on OCS 130 and communications overhead between Online Mediation Controller 120 and OCS 130.

FIGS. 2A-2D show sequence diagrams illustrating smart offloading functionality according to embodiments of the invention. FIGS. 2A-2D illustrate interactions between Charging Trigger Function (CTF) 270, SCIM 280, and Online Charging System (OCS) 276. SCIM 280 includes Offloading Function 282, Local-OCS 286, and Session Detail Record (SDR) Processor 286.

Figure 2A:
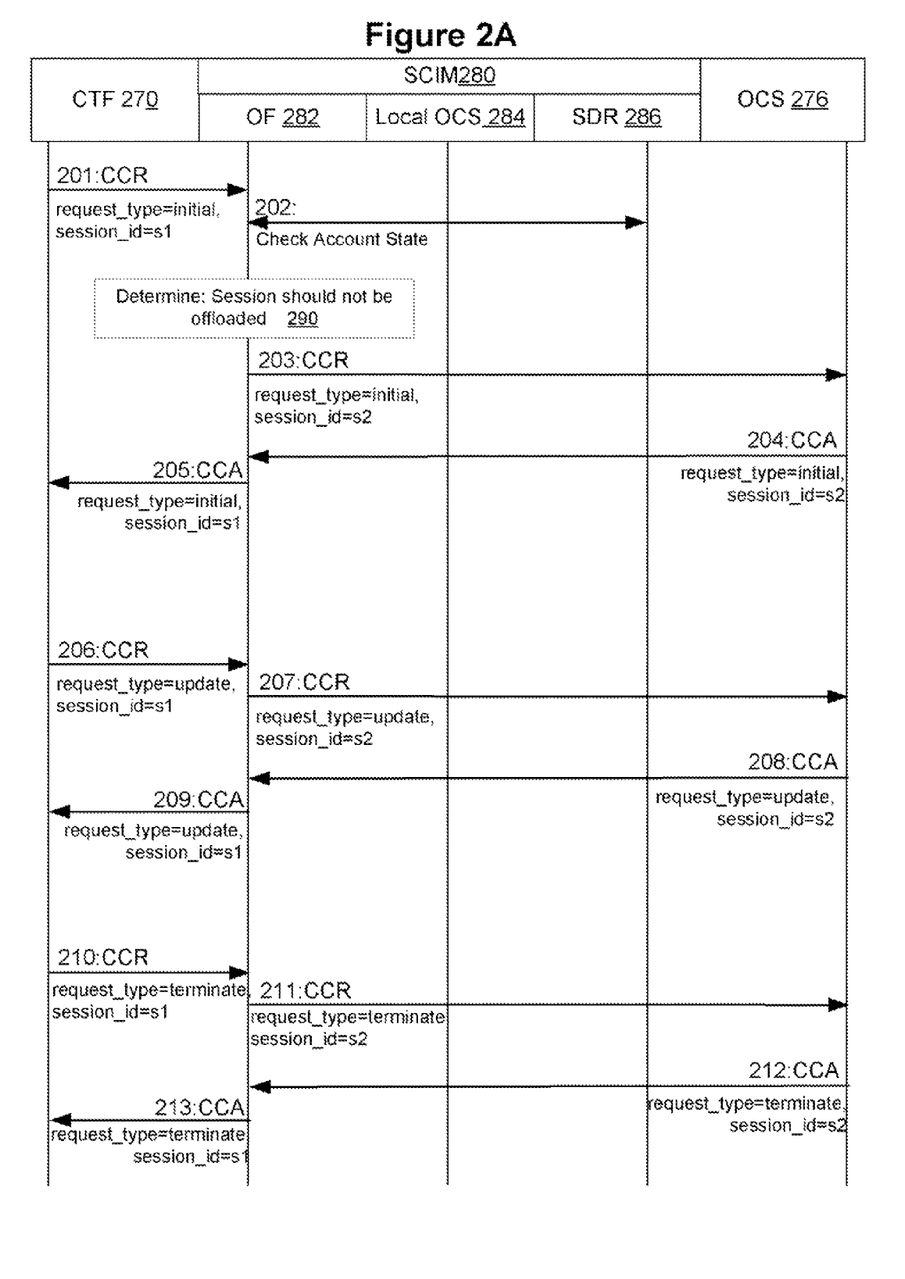
FIGS. 2A-2D show sequence diagrams illustrating augmented smart offloading functionality according to embodiments of the invention.
Figure 2B:
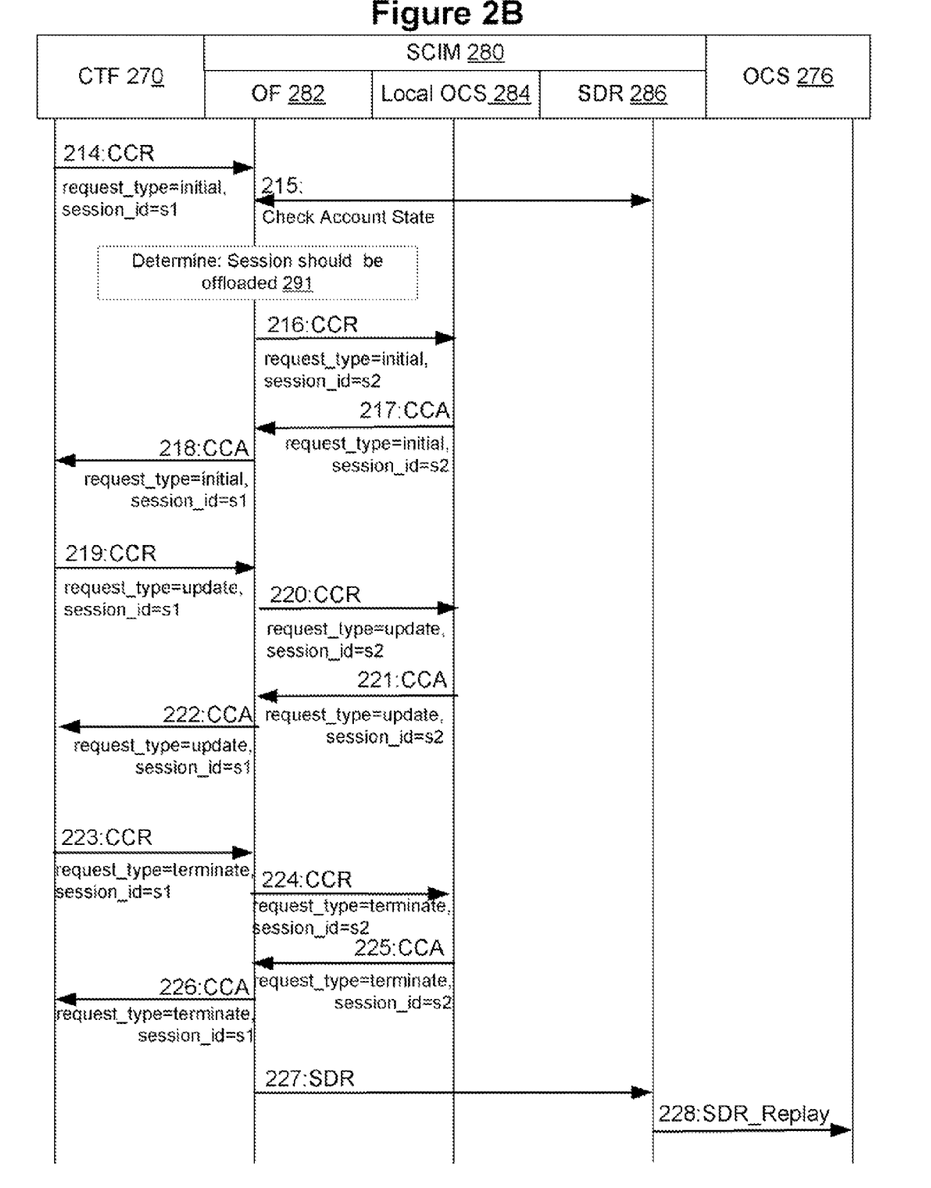

Utilizing a first offloading algorithm SCIM 280 makes a determination, using Offloading Function 282, whether the session should be offloaded upon session initiation. SCIM 280 receives initial session event and unifies it in the Charging Mediation (see FIG. 1). Offloading Function 282 of SCIM 280 checks account state in OCS. Offloading Function 282 of SCIM 280 then decides based on the account state and the service requested if this session can be offloaded. If the session should not be offloaded, the session is charged against OCS in an online manner. If the session should be offloaded: the session is directed to Local-OCS 284 that limits the session duration and provides allocation (to make sure the offloaded session will be effectively managed and later rated as if it was charged in an online manner directly to the OCS. When the session ends the SCIM 280 forwards the Session Detail Record (SDR) of the ended session to the SDR Processor which replays the SDR toward the OCS. The replay of the SDR to the OCS is accomplished in a substantially shorter duration than the length of the session with the Local-OCS.

As an example consider a user who has a flat rate plan of $0.01 per minute of voice call and $0.01 per MB data. User has a current balance of $1.00. Using the first algorithm the SCIM 280 will decide to offload user's voice call because voice calls are limited to maximum 10 minutes, and therefore a voice call cannot possibly exceed user's current balance. However SCIM 280 will decide that a data session will be charged online. This is whereas the data session may quickly exceed 100 MB of data and thus exceed user's current balance.

FIG. 2A illustrates operation of the smart-offloading functionality using the first algorithm in a situation where an initial determination is made that the session should not be offloaded. As shown in FIG. 2A, at step 201, the CTF 270 sends an initial CCR to SCIM 280 for a user session id=s1. At step 202, Offloading Function 282 communicates with the OCS to check the account state. At step 290 Offloading Function 282 makes a determination based on the account state and the service requested that the session should not be offloaded. This decision is made, for example, when the session may exceed the current account balance.

Because Offloading Function 282 determined that the session should not be offloaded, the session is charged against OCS 276 in an online manner. At step 203, SCIM 280 sends an initial CCR to OCS 276. At step 204, OCS 276 responds with an initial CCA. At step 205 SCIM 280 sends an initial CCA to CTF 270.

At step 206 CTF 270 sends an update CCR to SCIM 280. In response, SCIM 280 sends an update CCR to OCS 276 at step 207. OCS 276 responds to SCIM 280 with an update CCA at step 208. In response, SCIM 280 sends an update CCA to CTF 270 at step 209. Multiple updates may be performed during the session.

At step 210 CTF 270 sends a terminate CCR to SCIM 280. In response, SCIM 280 sends a terminate CCR to OCS 276 at step 211. OCS 276 responds to SCIM 280 with a terminate CCA at step 212. In response, SCIM 280 sends a terminate CCA to CTF 270 at step 213.

FIG. 2B illustrates operation of the smart-offloading functionality using the first algorithm in a situation where an initial determination is made that the session should be offloaded. As shown in FIG. 2B, at step 214, the CTF 270 sends an initial CCR to SCIM 280 for a user session id=s1. At step 215, Offloading Function 282 communicates with the OCS 276 to check the account state. At step 291, Offloading Function 282 makes a determination based on the account state and the service requested that the session should be offloaded. This decision is made, for example, when the session will not exceed the current account balance.

Because Offloading Function 282 determined that the session should be offloaded, the session is charged against the Local-OCS 284. At step 216, Offloading Function 282 sends an initial CCR to Local-OCS 284. At step 217, Local-OCS 284 responds with an initial CCA. At step 218 Offloading Function 282 sends an initial CCA to CTF 270.

At step 219 CTF 270 sends an update CCR to SCIM 280. In response, Offloading Function 282 sends an update CCR to Local-OCS 284 at step 220. Local-OCS 284 responds to Offloading Function 282 with an update CCA at step 221. In response, Offloading Function 282 sends an update CCA to CTF 270 at step 222. Multiple updates may be performed during the session.

At step 223 CTF 270 sends a terminate CCR to SCIM 280. In response, Offloading Function 282 sends a terminate CCR to Local-OCS 284 at step 223. Local-OCS 284 responds to Offloading Function 282 with a terminate CCA at step 225. In response, Offloading Function 282 sends a terminate CCA to CTF 270 at step 226. Offloading Function 282 initiates session replay by SDR Processor 286 at step 227. At step 228 SDR Processor 286 replays the charging session to OCS 276 thereby charging the used units to OCS 276.

The first algorithm, described above, requires an operator to decide on a criteria/threshold combined with a service on which offloading will be applied at session start. A second algorithm, described below, allows for additional decision points during the session to switch from offline to online and is therefore much more flexible and allows offloading in a wider range of circumstances.

Figure 2C:
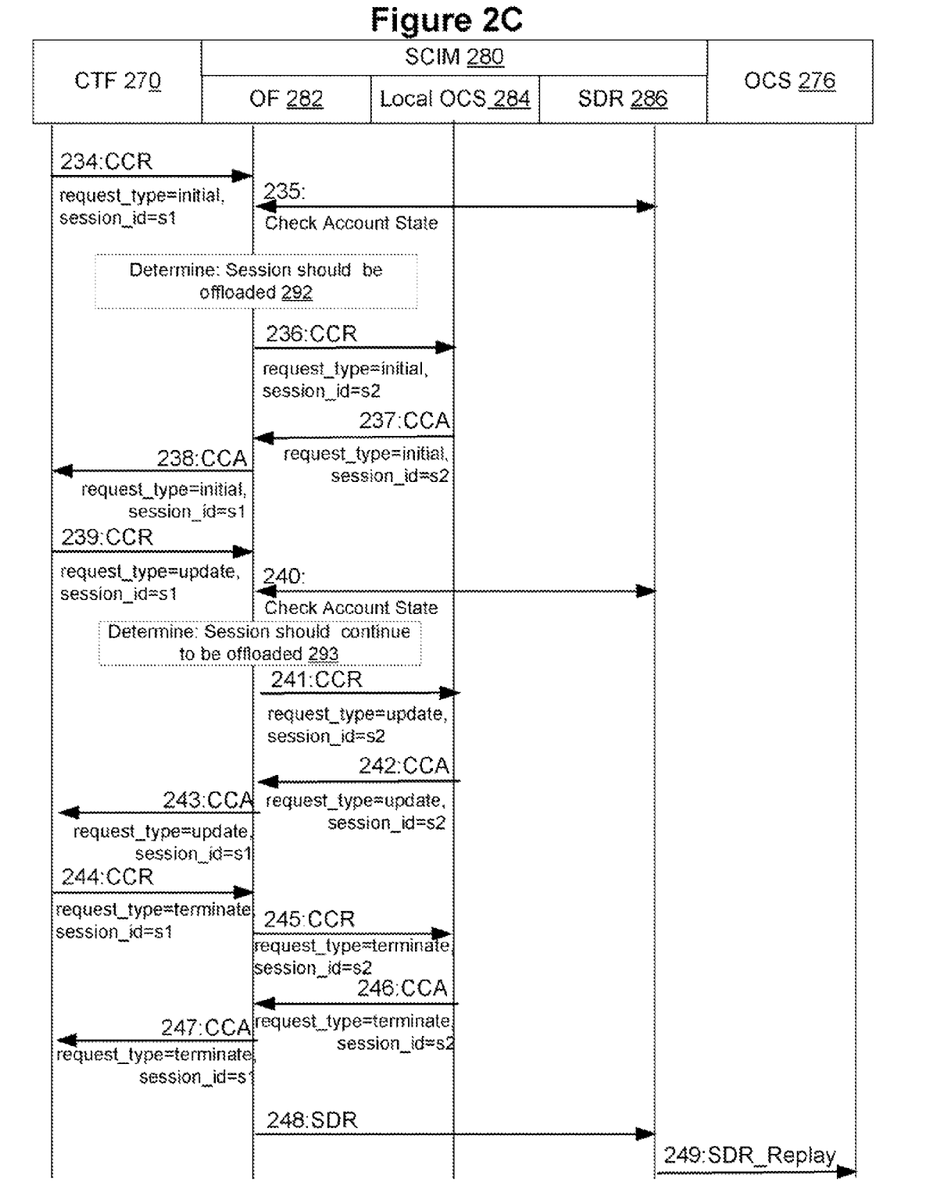
Figure 2D:
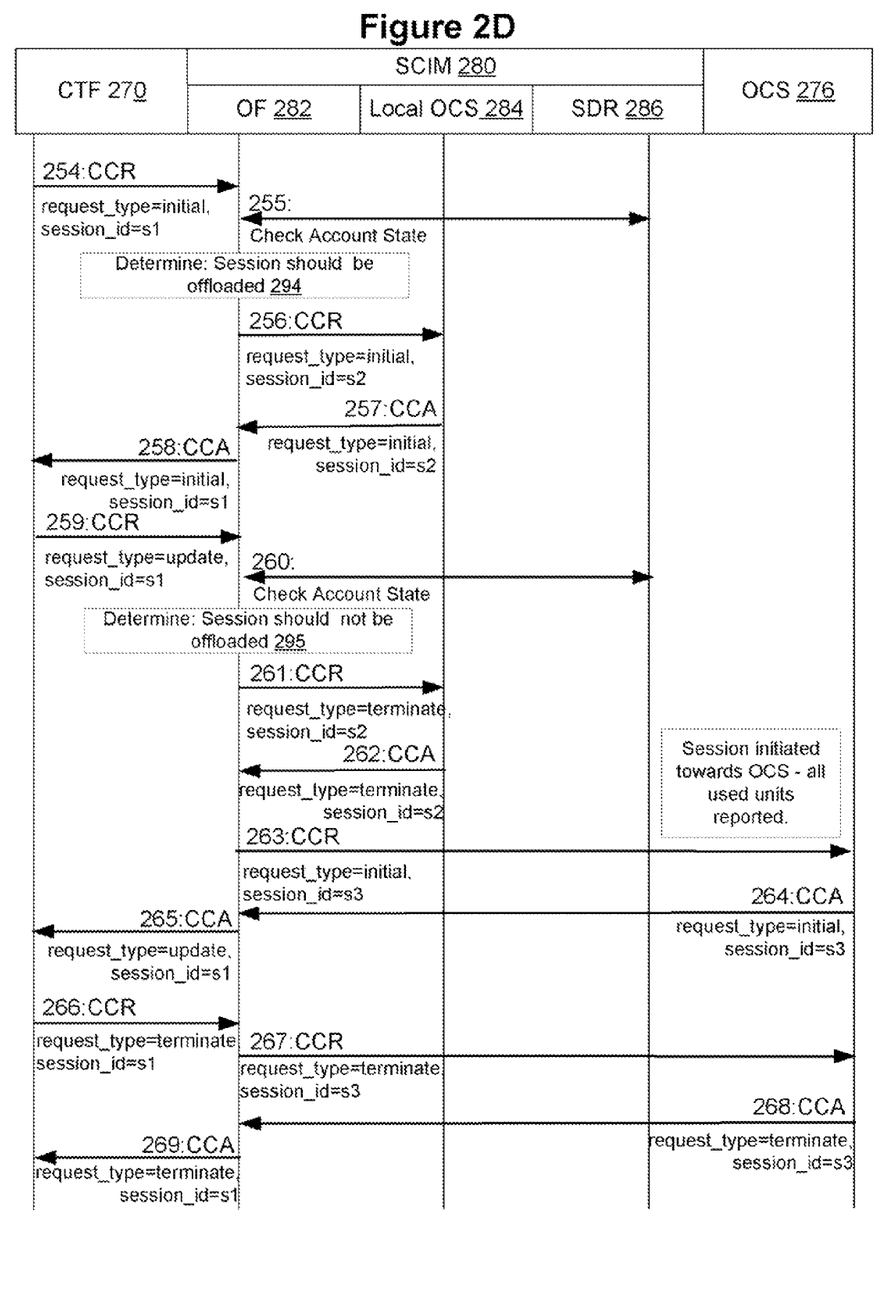

In the second algorithm the SCIM receives a session event and unifies it in Charging Mediation (See FIG. 1). The Offloading Function 282 checks account state in OCS 276. Offloading Function 282 then makes a determination based on the account state, session state and session event requested if this session can be offloaded. If the session cannot be offloaded the Offloading Function 282 initiates on online charging session with OCS 276. If Offloading Function 282 determines that the session should be offloaded to the Local-OCS 284, and the CCR is an initial CCR, the session is directed to Local-OCS 284 which limits the session duration and provides allocation (to make sure the offloaded session will be effectively managed and later rated as if it was charged in an online manner directly to the OCS 276).

As the session continues, if the session is offloaded, when the SCIM 280 receives an update CCR from CTF 270, Offloading Function 282 checks account status with the OCS 276 again. Offloading Function 282 then makes an updated determination whether, based on the account state, session state and session event requested if this session can continue to be offloaded. If the Offloading Function 282 determines that the session cannot continue to be offloaded, Offloading Function 282 initiates an online session with OCS 276 and includes all the used units up to this point in the request toward the OCS 276, it also terminates the session toward the Local-OCS 284. If Offloading Function 282 determines the session should continue to be offloaded, Offloading Function 282 continues to direct the session to Local-OCS 284. When Offloading Function 282 receives a terminate CCR from CTF 270 during an offloaded session, SCIM terminates the session toward the Local-OCS 284 and activates the SDR Processor 286 to replay the Session Detail Record toward OCS 276.

While the first algorithm provides a single decision point at the session start, the second algorithm introduces the ability to decide on offloading on every session event and greatly increases the possibility to use offloading in:

1. Parts of sessions—by allowing a transition from Local-OCS 284 to online OCS 276; and
2. More sessions—because it reduces the range in which the operator needs to decide to force online charging.

For example considering the user in the example above and a data session. The data session can be offloaded till the point in which the balance is much lower—i.e. the used MB of data has reached a certain threshold—and then switched to be online. Thus, the second algorithm allows for offloading even in circumstances where the total session may exceed the account balance. This is because Offloading Function 282 may provide incremental allocations that require the CTF 270 to send an update CCR before exceeding the account balance and then make a renewed determination as to whether the session should be continue to be offloaded to the Local-OCS 284 or should instead be directed to the OCS 276.

FIG. 2C illustrates operation of the smart-offloading functionality using the second algorithm in a situation where an initial determination is made that the session should be offloaded and an updated determination is made that the session should continue to be offloaded. As shown in FIG. 2C, at step 234, the CTF 270 sends an initial CCR to Offloading Function 282 for a user session id=s1. At step 235, Offloading Function 282 communicates with the OCS 276 to check the account state. At step 292, Offloading Function 282 makes a determination based on the account state and the service requested that the session should be offloaded. This decision is made, for example, when the session will not exceed the current account balance prior to an update CCR.

Because Offloading Function 282 determined that the session should be offloaded, the session is charged against the Local-OCS 284. At step 236, Offloading Function 282 sends an initial CCR to Local-OCS 284. At step 237, Local-OCS 284 responds with an initial CCA. At step 218 Offloading Function 282 sends an initial CCA to CTF 270 with an allocation of units.

At step 239 CTF 270 sends an update CCR to Offloading Function 282. Offloading Function 282 communicates again with OCS 276 to check account state. At step 293, Offloading Function 282 makes a determination based on the account state and the service requested, and the units already used that the session should continue be offloaded. This decision is made, for example, when the session will not exceed the current account balance prior to an update CCR. Offloading Function 282 then sends an update CCR to Local-OCS 284 at step 241. Local-OCS 284 responds to Offloading Function 282 with an update CCA at step 242. In response, Offloading Function 282 sends an update CCA to CTF 270 at step 242. Multiple updates and determinations may be performed during the session.

At step 244 CTF 270 sends a terminate CCR to Offloading Function 282. In response, Offloading Function 282 sends a terminate CCR to Local-OCS 284 at step 245. Local-OCS 284 responds to Offloading Function 282 with a terminate CCA at step 246. In response, Offloading Function 282 sends a terminate CCA to CTF 270 at step 247. SCIM initiates session replay by SDR Processor 286 at step 248. At step 249 SDR Processor 286 replays the charging session to OCS 276 thereby charging the used units to OCS 276.

FIG. 2D illustrates operation of the smart-offloading functionality using the second algorithm in a situation where an initial determination is made that the session should be offloaded and an updated determination is made that the session should not continue to be offloaded. As shown in FIG. 2D, at step 254, the CTF 270 sends an initial CCR to Offloading Function 282 for a user session id=s1. At step 255, Offloading Function 282 communicates with the OCS 276 to check the account state. At step 294, Offloading Function 282 makes a determination based on the account state and the service requested that the session should be offloaded. This decision is made, for example, when the session will not exceed the current account balance prior to an update CCR.

Because Offloading Function 282 determined that the session should be offloaded, the session is charged against the Local-OCS 284. At step 256, Offloading Function 282 sends an initial CCR to Local-OCS 284. At step 257, Local-OCS 284 responds with an initial CCA. At step 258 Offloading Function 282 sends an initial CCA to CTF 270 with an allocation of units.

At step 259 CTF 270 sends an update CCR to Offloading Function 282. Offloading Function 282 communicates again with OCS 276 to check account state at step 260. At step 295, Offloading Function 282 makes a determination based on the account state and the service requested, and the units already used that the session should not continue be offloaded. This decision is made, for example, when the session may exceed the current account balance prior to an update CCR. Offloading Function 282 then sends a terminate CCR to Local-OCS 284 at step 261. Local-OCS 284 responds to Offloading Function 282 with a terminate CCA at step 262. At step 263, Offloading Function 282 sends an initial CCR to OCS 276 to initialize an online charging session. The initial CCR includes charging for all the units previously charged to Local-OCS 284. OCS 276 then responds, at step 264 with an initial CCA. In response Offloading Function 282 sends an update CCA to CTF 270 at step 265.

At step 266 CTF 270 sends a terminate CCR to Offloading Function 282. In response, Offloading Function 282 sends a terminate CCR to OCS 276 at step 267. OCS 276 responds to Offloading Function 282 with a terminate CCA at step 268. In response, Offloading Function 282 sends a terminate CCA to CTF 270 at step 269.

Figure 3:
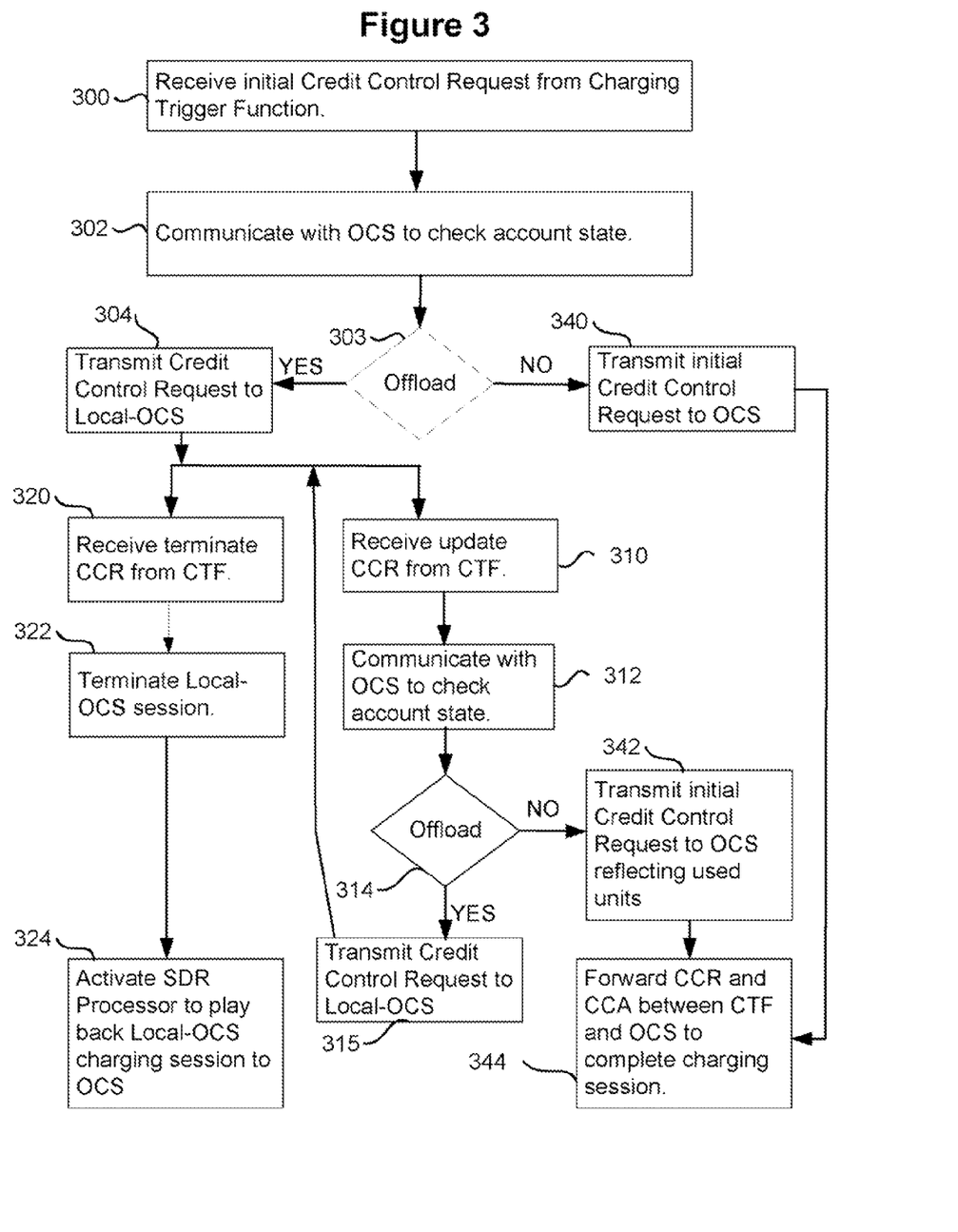
FIG. 3 shows a method for smart offloading of an OCS according to an embodiment of the invention.

FIG. 3 shows a method performed by a SCIM for smart offloading of an OCS according to an embodiment of the invention. As shown in FIG. 3, at step 300, the SCIM receives an initial CCR from a CTF. At step 302, the SCIM communicates with the OCS to check the account state. At step 303, the SCIM makes a determination based on the account state and the CCR whether to offload the session to the Local-OCS. If the SCIM determines that the session should not be offloaded, at step 340, the SCIM transmits the initial CCR to the OCS for charging in an online manner. Thereafter the SCIM mediates communications between the CTF and OCS to complete the session in the conventional manner, step 344. If the SCIM decides at step 303 that the session can be offloaded, the SCIM transmits the initial CCR to the Local-OCS at step 304.

While the session is offloaded, if the next event received by the SCIM is an update CCR from the CTF, step 310, the SCIM communicates again with the OCS to check the account state at step 312. At step 314, the SCIM makes a determination based on the account state and the CCR whether to continue to offload the session to the Local-OCS. If the SCIM decides at step 314 that the session can be offloaded, the SCIM transmits the update CCR to the Local-OCS at step 315 and waits for the next event. If the SCIM decides at step 314 that the session can not continue to be offloaded, the SCIM terminates the session toward the Local-OCS and initiates a session toward the OCS including in the initial request all the units previously charged to the Local-OCS at step 342. Thereafter the SCIM mediates communications between the CTF and OCS to complete the session in the conventional manner, step 344.

While the session is offloaded, if the next event received by the SCIM is a terminate CCR from the CTF, step 320, the SCIM terminates the session with the Local-OCS at step 322. The SCIM then activates the SDR Processor to replay the Session Detail Record to the OCS at step 324 thereby charging all units used in the session to the OCS.

Although the embodiments described above utilize the smart offloading method for smart offloading on the network side and toward the OCS. Smart offloading may also be used in all other cases in which it is desirable to enhance switching between online and offline charging. Mediation of charging can be used in many cases including for example, SIP-Ro, Ro-Ro, CAP-Ro, and WIN-Ro. Embodiments of the present invention can thus be used to enhance decision making regarding the switch from offline to online charging in all of these network types, including networks in which the network monitors and counts (Ro-Ro, Cap-Ro); and in which the SCIM monitors and counts (Sip-Ro, Cap-Ro, Win-Ro etc.).

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method in a service capability interaction manager (SCIM) for selectively offloading a charging session from an associated online charging system (OCS) to a local OCS of the SCIM, the method comprising:
   receiving an event from an associated network element in operative communication with the SCIM;
   checking an account status;
   making a determination whether a session should be offloaded based on said event and the account status;
   if the session should not be offloaded, initializing and mediating a charging session with the associated OCS;
   if the session should be offloaded, initializing and mediating an offloaded charging session with the local OCS of the SCIM and, upon termination of the offloaded charging session, replaying the offloaded charging session to the associated OCS.

2. The method of claim 1, wherein the local OCS limits the session duration and provides an allocation such that the offloaded charging session is effectively managed and later rated as if it was charged in an online manner directly to the associated OCS.

3. The method of claim 1, further comprising preparing a session detail record (SDR) of the offloaded charging session.

4. The method of claim 1, further comprising:
   receiving an additional event during an offloaded charging session;
   making an updated determination whether the offloaded charging session should be continue to be offloaded based on said additional event, the account status, and used units;
   if the session should not continue to be offloaded, terminating the offloaded charging session with the local OCS and initializing and mediating a charging session with the associated OCS where initiating the charging session with the associated OCS includes charging all units charged to the local OCS; and
   if the session should continue to be offloaded, updating the offloaded charging session with the local OCS.

5. The method of claim 1, wherein a session detail record (SDR) processor is used for replaying the offloaded charging session to the associated OCS.

6. The method of claim 1, wherein mediating an offloaded charging session with the local OCS reduces latency of credit control request/credit control accept (CCR/CCA) communications.

7. The method of claim 1, wherein mediating an offloaded charging session with the local OCS reduces burden on the associated OCS.

8. A non-transitory computer readable storage medium including instructions stored thereon which, when executed by a computer of a service capability interaction manager (SCIM), cause the computer to perform a method comprising the steps of:
   receiving an event from an associated network element;
   checking an account status;
   making a determination whether a session should be offloaded from an associated online charging system (OCS) to a local OCS of the SCIM based on said event and the account status;
   if the session should not be offloaded, initializing and mediating a charging session with the associated OCS;
   if the session should be offloaded, initializing and mediating an offloaded charging session with the local OCS of the SCIM and, upon termination of the offloaded charging session, replaying the offloaded charging session to the associated OCS.

9. The non-transitory computer readable storage medium of claim 8, wherein the local OCS limits the session duration and provides an allocation such that the offloaded charging session is effectively managed and later rated as if it was charged in an online manner directly to the associated OCS.

10. The non-transitory computer readable storage medium of claim 8, including instructions stored thereon which, when executed by a computer, cause the computer to perform a method comprising the further step of:
    preparing a session detail record (SDR) of the offloaded charging session.

11. The non-transitory computer readable storage medium of claim 8, including instructions stored thereon which, when executed by a computer, cause the computer to perform a method comprising the further steps of:
    receiving an additional event during an offloaded charging session;
    making an updated determination whether the session should be continue to be offloaded based on said additional event, the account status, and used units;
    if the session should not continue to be offloaded, terminating the offloaded charging session with the local OCS and initializing and mediating a charging session with the associated OCS where initiating the charging session with the associated OCS includes charging all units charged to the local OCS; and
    if the session should continue to be offloaded, updating the offloaded charging session with the local OCS.

12. The non-transitory computer readable storage medium of claim 8, wherein a session detail record (SDR) processor is used for replaying the offloaded charging session to the associated OCS.

13. The non-transitory computer readable storage medium of claim 8, wherein mediating an offloaded charging session with the local OCS reduces latency of credit control request/credit control accept (CCR/CCA) communications.

14. The non-transitory computer readable storage medium of claim 8, wherein mediating an offloaded charging session with the local OCS reduces burden on the associated OCS.

15. A system for selective offloading a charging session comprising:
    a service capability interaction manager (SCIM),
    a local online charging system (OCS), and
    a session detail record (SDR) processor;
    wherein the SCIM receives an event from an associated network element;
    wherein in response to said event the SCIM checks an account status with an associated OCS;
    wherein in response to checking account status, the SCIM makes a determination whether a session should be offloaded based on the event and the account status;

wherein if the session should not be offloaded, the SCIM initializes and mediates a charging session with the associated OCS; and wherein, if the session should be offloaded, the SCIM initializes and mediates an offloaded charging session with the local OCS, and wherein, upon termination of the offloaded session, the SDR processor replays the offloaded charging session to the associated OCS.

16. The system of claim 15, wherein the local OCS limits the session duration and provides an allocation such that the offloaded charging session is effectively managed and later rated as if it was charged in an online manner directly to the associated OCS.

17. The system of claim 15, wherein the SCIM maintains a session detail record (SDR) of the offloaded charging session.

18. The system of claim 15, wherein:

the SCIM receives an additional event during an offloaded charging session;

wherein, in response to said additional event the SCIM makes an updated determination whether the session should be continue to be offloaded based on the additional event, the account status, and used units;

wherein, if the session should not continue to be offloaded, the SCIM terminates the offloaded charging session with the local OCS and initializes and mediates a charging session with the associated OCS, where initiating the charging session with the associated OCS includes charging all units previously charged to the local OCS; and wherein, if the session should continue to be offloaded, the SCIM updates the offloaded charging session with the local OCS.

19. The system of claim 15, wherein mediating an offloaded charging session with the local OCS reduces latency of credit control request/credit control accept (CCR/CCA) communications.

20. The system of claim 15, wherein mediating an offloaded charging session with the local OCS reduces burden on the associated OCS.

* * * * *